Figure 1:
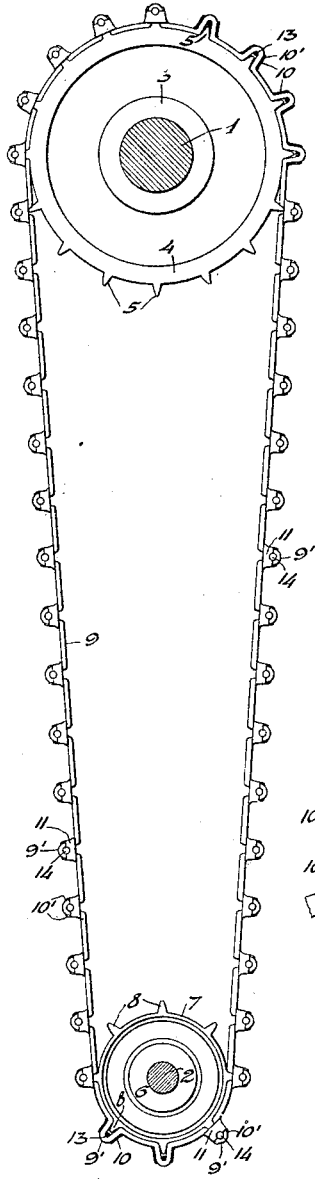

P. DIEHL.
BELT FOR SPROCKET GEARING.
APPLICATION FILED FEB. 7, 1913.

1,121,987.

Patented Dec. 22, 1914.

WITNESSES:
Géza Terван
Leonard E. Fischer.

INVENTOR
Philip Diehl
BY
Henry J. Miller
ATTORNEY

UNITED STATES PATENT OFFICE.

PHILIP DIEHL, OF ELIZABETH, NEW JERSEY, ASSIGNOR TO THE SINGER MANUFACTURING COMPANY, A CORPORATION OF NEW JERSEY.

BELT FOR SPROCKET-GEARING.

1,121,987.   Specification of Letters Patent.   Patented Dec. 22, 1914.

Application filed February 7, 1913. Serial No. 746,692.

*To all whom it may concern:*

Be it known that I, PHILIP DIEHL, a citizen of the United States, residing at Elizabeth, in the county of Union and State of New Jersey, have invented certain new and useful Improvements in Belts for Sprocket-Gearing, of which the following is a specification, reference being had therein to the accompanying drawings.

This invention relates to an improvement in that class of driving belts designed not only to transmit motion from one to another pulley but to maintain a given relative timing of said pulleys without the slip common to the ordinary driving band and smooth faced pulleys.

The invention has for its object to provide a belt of this type having a non-metallic operative face and gear-tooth pockets or shoulders adapted for engagement with the usual metallic sprocket-wheels, so as to provide a durable and flexible belt avoiding all metal-to-metal contact, and therefore noiseless in operation, such a belt being specially adapted for that class of high speed sewing machines in which the upper and lower shafts are connected to run at different speeds.

The invention consists primarily in a flexible non-metallic endless band having at intervals in its operative face spaced shoulders adapted for engagement with complemental shoulders upon the pulleys or sprocket-wheels embraced thereby and thus affording provision against slippage of the belt. In its preferred form, the belt comprises an endless band of textile material provided at intervals in its length with metallic clips each having two spaced shoulders adapted to bear upon the outer face of the band and laterally offset bearings in which is disposed a loose pin parallel with said shoulders and over which the band is led between the spaced shoulders so as to form transverse gear-tooth pockets in the inner face of the band. By this means, a flexible belt is formed with a smooth inner or operative face which not only provides gear-tooth pockets to receive the teeth of sprocket-wheels, but is susceptible of being twisted for adaptation to establish driving connection between pulleys upon angularly arranged shafts or shafts requiring movement in opposite directions. By this means it is practicable to employ a continuous woven endless band with its component threads uncut and uninjured by perforations such as those heretofore made in providing spaced shoulders for engagement with sprocket-wheels. The gear-tooth pockets thus formed constitute merely outwardly extending crooks therein having operative faces continuous with that of the body of the band, and the latter thus presents no raw edges to be frayed by continued use of the belt at high speed.

Figure 3:
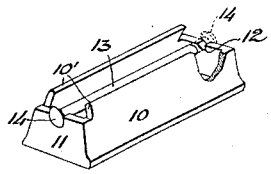
Figure 4:
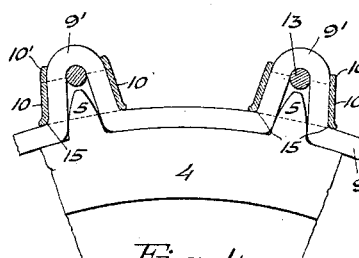
Figure 2:
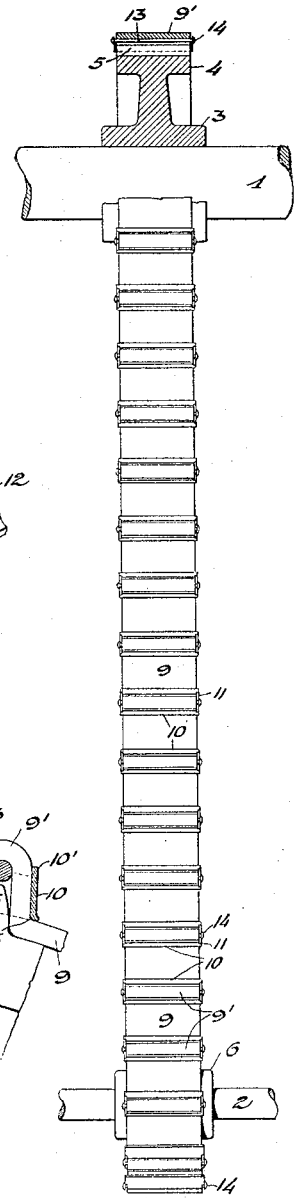

In the accompanying drawing, Figures 1 and 2 are respectively side and face views of two sprocket-wheels connected by a belt constructed in accordance with the present improvement. Fig. 3 is a perspective view, upon a larger scale, of one of the clips applied to the band to produce the non-metallic gear-tooth pockets or cavities. Fig. 4 is a side view, upon a much larger scale than Figs. 1 and 2, of a portion of one of the sprocket-wheels and the belt encircling the same, with the clips represented in transverse section.

As represented in the drawings, the present improvement is employed in establishing driving connection between an upper driving shaft 1 and a lower driven shaft 2 disposed parallel therewith. The driving shaft has secured thereon the hub 3 of the driving sprocket-wheel having upon the peripheral face of its rim 4 the transverse gear-teeth 5. The driven shaft 2 has similarly applied thereto the hub 6 of the driven sprocket-wheel having the peripheral face of its rim 7 provided with the transverse gear-teeth 8 spaced apart correspondingly with the teeth 5 of the driving sprocket-wheel. The driven sprocket-wheel is represented as of one-half the diameter of the driving sprocket-wheel.

Embracing and connecting the two sprocket-wheels is the driving belt 9 which is preferably formed of textile material and may be woven in an endless band of the requisite thickness. This belt may be composed of a cord wound in a series of convolutions arranged side by side, as in the United States Patent to A. Steward No. 667,830, of February 12, 1901, or of a series of overlapping convolutions of a tape having its ends fastened upon the convolutions upon which they are lapped, as represented in the patent to H. E. Smallbone, No. 826,899, July 24, 1906. The belt may therefore be of single ply or laminated either in thickness or in width.

Disposed at intervals crosswise of the belt 9 are the hollow rectangular metal clips preferably struck up from sheet metal with slightly convergent sides 10 and substantially parallel ends 11 provided in their upper or outer edges with alined bearing notches 12. Resting within the notches 12 are the loose cross-pins 13 confined from endwise displacement therein by means of the heads 14 adapted to engage the outer faces of the end members 11 of the clips. As will be readily observed, particularly by reference to Fig. 4, the slightly rounded extremities 15 of the side members 10 of the clips farthest from the cross-pins 13 afford spaced shoulders beneath which the band 9 is led over and around the pin 13 and thence beneath the other shoulder 15 to the adjacent clip. The side members 10 are preferably formed with rounded extensions or lips 10' slightly bent inwardly toward each other so as to confine the adjacent portion of the band 9 closely to the pin 13 for preventing any slack in the band which is liable to gradually pull out in the continued use of the same and thereby produce an undesirable elongation of the belt, which should be in practice as nearly as possible inextensible although very flexible to permit of bending around a very small driven pulley such as is commonly used in sewing machines.

As will be seen by reference particularly to Fig. 4 of the drawings, the edges 15 of the side members 10 afford spaced bending shoulders acting in conjunction with the intermediate and laterally offset shoulder afforded by the pin 13 to form the crook 9' in the imperforate band 9, these bending shoulders being disposed in triangular relation for the purpose. In applying the clips, a loop 9' of the band may be drawn through the same between the shoulders 15, the pin 13 passed through said loop and seated within the bearing notches 12, the band drawn taut to seat the apex of the crook firmly upon the cross-pin, and the extensions or lips 10' then preferably bent inwardly slightly to maintain the parts in their relative positions.

By the construction above described, a series of crooks is formed in the outer face of the band which produce in the opposite face a corresponding series of transverse gear-tooth pockets affording non-metallic shoulders for engagement with the peripheral teeth of the metallic sprocket-wheels.

While I have shown herein the preferred means of producing a strong, flexible, durable and inexpensive belt having non-metallic surfaces throughout for engagement with the metallic complemental members of the driving and driven pulleys, it is to be understood that the present improvement is not limited to the specific means employed to this end, but embraces within its scope other means utilizing a continuous and imperforate driving band for providing the latter with spaced shoulders presenting faces of the same material for engagement with those of the pulleys which such band embraces.

Having thus set forth the nature of the invention, what I claim herein is:—

A driving belt composed of an endless flexible band provided at intervals in its length with sheet-metal clips formed with two spaced shoulders adapted to bear upon the outer face of the band and with substantially parallel end members having alined bearing notches in their upper edges, and a loose pin fitted within the notches of each clip and formed with transverse walls abutting the faces of said end members, the band being led over each pin intermediate said spaced shoulders to form gear-tooth pockets in its inner face.

In testimony whereof, I have signed my name to this specification, in the presence of two subscribing witnesses.

PHILIP DIEHL.

Witnesses:
 JAMES G. GREENE,
 HENRY A. KORNEMANN, Jr.

Copies of this patent may be obtained for five cents each, by addressing the "Commissioner of Patents, Washington, D. C."